(12) United States Patent
Szor

(10) Patent No.: US 7,281,271 B1
(45) Date of Patent: Oct. 9, 2007

(54) EXCEPTION HANDLING VALIDATION SYSTEM AND METHOD

(75) Inventor: Peter Szor, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 833 days.

(21) Appl. No.: 10/671,152

(22) Filed: Sep. 25, 2003

(51) Int. Cl.
*H04L 9/00* (2006.01)

(52) U.S. Cl. .......................... 726/25; 726/22; 726/23; 726/24; 713/165; 713/167; 713/188

(58) Field of Classification Search ................ None
See application file for complete search history.

(56) References Cited

U.S. PATENT DOCUMENTS

| | | | |
|---|---|---|---|
| 5,822,517 A | 10/1998 | Dotan ........................ | 395/186 |
| 6,301,699 B1 | 10/2001 | Hollander et al. ............. | 717/4 |
| 6,412,071 B1 * | 6/2002 | Hollander et al. ............ | 726/23 |

OTHER PUBLICATIONS

Xenitellis, S., 'Security Vulnerabilities in Event-Driven Systems', ISG, Royal Holloway Univ. of London, 2002, entire document, http://www.isg.rhul.ac.uk/~simos/pub/OLD/SecurityVulnerabilitiesInEvent-drivenSystems.pdf.*
Choi, Y., et al, 'A New Stack Buffer Overflow Hacking Defense Technique with Memory Address Confirmation', ICISC 2001: 4th International Conference Seoul, Korea, Dec. 6-7, 2001. Proceedings, pp. 146-159, http://www.springerlink.com/content/x8tn836pk6wy8kw/fulltext.pdf.*
Cheriton, D., et al, 'A Caching Model of Operating System Kernel Functionality', CS Dept., Stanford Univ., 1994, entire document, http://delivery.acm.org/10.1145/1270000/1267652/p14-cheriton.pdf?key1=1267652&key2=6653845811&coll=&dl=&CFID=15151515&CFTOKEN=6184618.*

(Continued)

*Primary Examiner*—Nasser Moazzami
*Assistant Examiner*—Ronald Baum
(74) *Attorney, Agent, or Firm*—Gunnison, McKay & Hodgson, L.L.P.; Serge J. Hodgson

(57) ABSTRACT

A method includes determining whether the exception handling frames on the stack are uncorrupt prior to execution of an exception handler dispatcher. Upon a determination that the exception handling frames on the stack are uncorrupt, the method further includes allowing the execution of the exception handler dispatcher to proceed. Conversely, upon a determination that the exception handling frames on the stack are corrupt, protective action is taken to prevent the malicious code on the host computer system from exploiting and/or damaging the host computer system.

25 Claims, 8 Drawing Sheets

OTHER PUBLICATIONS

Chien, E. and Szor, P., "*Blended Attacks Exploits, Vulnerabilities and Buffer-Overflow Techniques In Computer Viruses*", Virus Bulletin Conference, Sep. 2002, Virus Bulletin Ltd., The Pentagon, Abingdon, Oxfordshire, England, pp. 1-36.

Dabak, P., Borate, M. and Phadke, S., "*Hooking Windows NT System Services*", pp. 1-8 [online]. Retrieved on Apr. 16, 2003. Retrieved from the Internet: <URL:http://www.windowsitlibrary.com/Content/356/06/2.html>.

"*How Entercept Protects: System Call Interception*", pp. 1-2 [online]. Retrieved on Apr. 16, 2003. Retrieved from the Internet: <URL:http://www.entercept.com/products/technology/kernelmode.asp>. No author provided.

"*How Entercept Protects: System Call Interception*", p. 1 [online]. Retrieved on Apr. 16, 2003. Retrieved from the Internet: URL:http://www.entercept.com/products/technology/interception.asp>. No author provided.

McCorkendale, B. and Szor, P., "*Code Red Buffer Overflow*", Virus Bulletin, Sep. 2001, Virus Bulletin Ltd., The Pentagon, Abingdon, Oxfordshire, England, pp. 4-5.

Pietrek, M., "*Under the Hood, new Vectored Exception Handling in Windows XP*", pp. 1-7 [online]. Retrieved on Aug. 6, 2003. Retrieved from the Internet : <URL:http://msdn.microsoft.com/msdnmag/issues/01/09/hood/default.aspx>.

Pietrek, M., "*A Crash Course on the Depths of Win32tm Structured Exception Handling*", Jan. 1997, 24 pages. Retrieved from the Internet: <URL:http://WWW.Microsoft.com/msj/0197/exception/exception.aspx> on Aug. 6, 2003.

\* cited by examiner

EXCEPTION HANDLING VALIDATION SYSTEM AND METHOD

BACKGROUND OF THE INVENTION

1. Field of the Invention

The present invention relates to the protection of computer systems. More particularly, the present invention relates to a malicious code blocking system and method.

2. Description of the Related Art

Buffer overflow techniques have been used by malicious hackers and virus writers to attack computer systems. Buffers are data storage areas, which generally hold a predefined amount of finite data. A buffer overflow occurs when a program attempts to store data into the buffer, where the data is larger than the size of the buffer.

One category of buffer overflow, sometimes called stack-based buffer overflow, involves overwriting stack memory. Stack-based buffer overflow is typically caused by programs that do not verify the length of the data being copied into a buffer.

When the data exceeds the size of the buffer, the extra data can overflow into the adjacent memory locations. In this manner, it is possible to corrupt valid data and possibly to change the execution flow and instructions. Thus, by exploiting a buffer overflow, it is possible to inject malicious code, sometimes called shell code, into the execution flow. This shell code allows remote system level access, giving unauthorized access to not only malicious hackers, but also to replicating malware, e.g., worms.

SUMMARY OF THE INVENTION

In accordance with one embodiment, a method includes hooking an exception handler dispatcher; stalling execution of the exception handler dispatcher upon invocation of the exception handler dispatcher; and determining whether exception handling is valid, e.g., determining whether the exception handling frames on the stack are uncorrupt.

Upon a determination that the exception handling is valid, the method further includes allowing the execution of the exception handler dispatcher to proceed. Conversely, upon a determination that the exception handling is not valid, e.g., that the exception handler frames on the stack are corrupt indicating an exception handler buffer overflow attack has occurred, protective action is taken to prevent the malicious code on the host computer system from exploiting and/or damaging the host computer system.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 2:
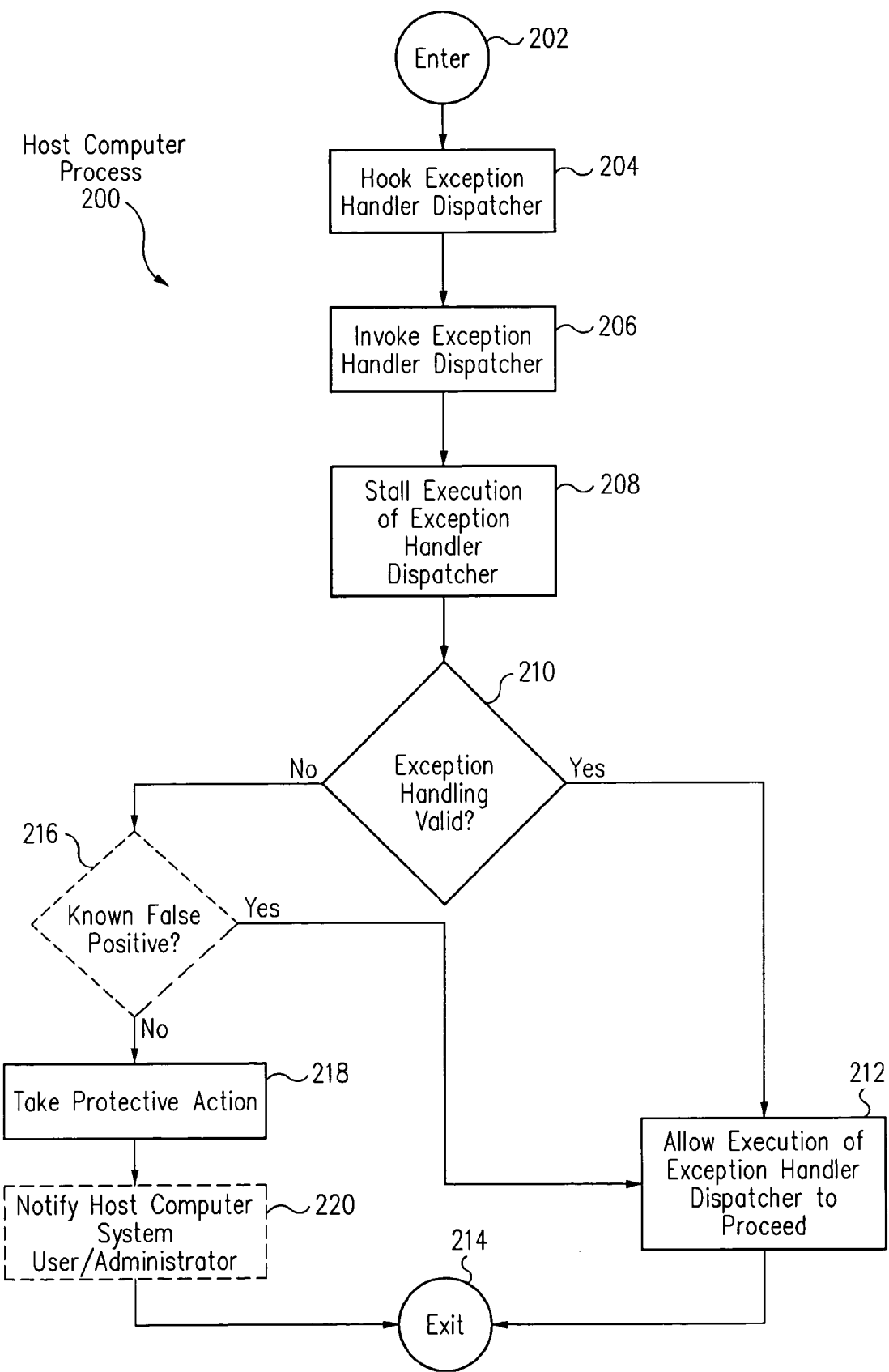
FIG. 2 is a flow diagram of a host computer process in accordance with one embodiment of the present invention.

In accordance with one embodiment, referring to FIG. 2, a method includes hooking an exception handler dispatcher (operation 204); stalling execution of the exception handler dispatcher (operation 208) upon invocation of the exception handler dispatcher (operation 206); and determining whether exception handling is valid (check operation 210). Upon a determination that the exception handling is valid, the method further includes allowing the execution of the exception handler dispatcher to proceed (operation 212).

In a typical exception handler buffer overflow attack, the exception handler frames on the stack are exploited using a buffer overflow. Thus, when an exception is raised, e.g., due to the buffer overflow exploit itself, the exception handler dispatcher attempts to locate an exception handler by searching the exception handler frames on the stack of the thread in which an exception occurred. Thus, since a determination is made that the exception handling is valid, e.g., that the exception handler frames on the stack of the thread in which an exception occurred are not corrupt, the likelihood that malicious code is attempting an attack on host computer system 102 is minimal and execution of the exception handler dispatcher is allowed to proceed (operation 212).

However, if a determination is made that the exception handling is not valid, e.g., that the exception handler frames on the stack are corrupt indicating an exception handler buffer overflow attack has occurred, protective action is taken (operation 218).

For example, execution of the exception handler dispatcher is terminated. By terminating execution of the exception handler dispatcher, the malicious code on the host computer system is prevented from exploiting and/or damaging the host computer system.

Figure 1:
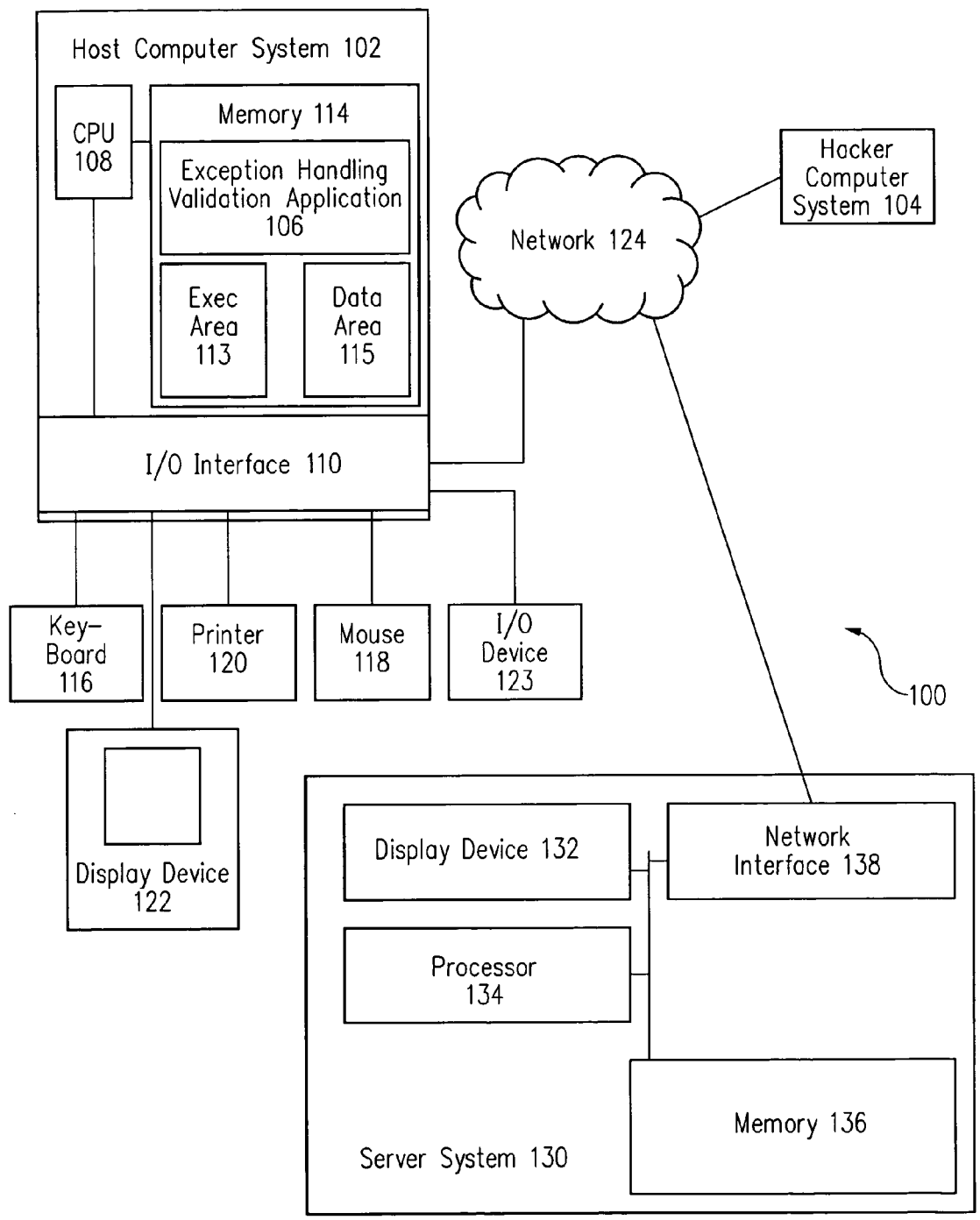
FIG. 1 is a diagram of a client-server system that includes an exception handling validation application executing on a host computer system in accordance with one embodiment of the present invention.

More particularly, FIG. 1 is a diagram of a client-server system 100 that includes an exception handling validation application 106 executing on a host computer system 102, e.g., a first computer system, in accordance with one embodiment of the present invention.

Host computer system 102, sometimes called a client or user device, typically includes a central processing unit (CPU) 108, hereinafter processor 108, an input output (I/O) interface 110, and a memory 114. Host computer system 102 may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102. In one embodiment, exception handling validation application 106 is loaded into host computer system 102 via I/O device 123, such as from a CD, DVD or floppy disk containing exception handling validation application 106.

In one embodiment, memory 114 includes an executable area 113 and a data area 115. Executable area 113 is an area of memory 114 in which executable applications are located.

In one embodiment, memory 114 includes a page based virtual memory system that uses pages, e.g., 4096 byte memory areas. These pages have individual properties such as, for example, that they are writable and/or executable. A page is writable if it is marked as writable, i.e., is marked as a page for storage of data. A page is executable if it is marked as executable, i.e., is marked as a page for storing executable content. In accordance with this embodiment, executable area 113 includes pages that are marked as executable. For example, executable area 113 includes pages that are marked as executable and writable.

In one embodiment, a set of flags describe the properties of a page. For example, these flags are maintained in the pages tables or in other operating system managed lists or databases.

In contrast, data area 115 is an area of memory 114 in which executable applications are not located, e.g., data area 115 is an area of memory 114 in which data is located. Examples of data area 115 include the stack, heap, and pages that are not marked as executable, i.e., non-executable pages.

Host computer system 102 is coupled to a server system 130 of client-server system 100 by a network 124. Server system 130 typically includes a display device 132, a processor 134, a memory 136, and a network interface 138.

Further, host computer system 102 is also coupled to a hacker computer system 104 of client-server system 100 by network 124. In one embodiment, hacker computer system 104 is similar to host computer system 102, for example, includes a central processing unit, an input output (I/O) interface, and a memory. Hacker computer system 104 may further include standard devices like a keyboard, a mouse, a printer, a display device and an I/O device(s). The various hardware components of hacker computer system 104 are not illustrated to avoid detracting from the principals of the invention.

Network 124 can be any network or network system that is of interest to a user. In various embodiments, network interface 138 and I/O interface 110 include analog modems, digital modems, or a network interface card.

Exception handling validation application 106 is stored in memory 114 of host computer system 102 and executed on host computer system 102. The particular type of and configuration of host computer system 102, hacker computer system 104, and server system 130 are not essential to this embodiment of the present invention.

FIG. 2 is a flow diagram of a host computer process 200 in accordance with one embodiment of the present invention. Referring now to FIGS. 1 and 2 together, execution of exception handling validation application 106 by processor 108 results in the operations of host computer process 200 as described below in one embodiment.

From an enter operation 202, flow moves to a hook exception handler dispatcher operation 204. In hook exception handler dispatcher operation 204, the exception handler dispatcher of host computer system 102 is hooked.

As is well known to those of skill in the art, an exception is an event that occurs during the execution of a program, and requires the execution of code outside the normal flow of control. There two kinds of exceptions: hardware exceptions and software exceptions. Hardware exceptions are initiated by the CPU. They can result from the execution of certain instruction sequences, such as division by zero and attempt to access an invalid memory address. Software exceptions are initiated explicitly by applications or the operating system. For example, the system can detect when an invalid parameter value is specified. In one embodiment, an exception is raised when it is realized that some of the stack parameters to a function are incorrect.

Structured exception handling is a mechanism for handling both hardware and software exceptions. The structured exception handling enables complete control over the handling of exceptions, provides support for debuggers, and is usable across all programming languages and machines.

When an exception is raised, an exception handler dispatcher, e.g., a user mode exception handler dispatcher, attempts to locate an exception handler, sometimes called a frame based exception handler, by searching the exception handler frames on the stack of the thread in which the exception occurred. Further, after the exception handler is located, the exception handler dispatcher calls, sometimes called executes, the exception handler.

In one embodiment, the exception handler dispatcher is hooked by modifying the code of the exception handler dispatcher itself to redirect flow to an exception handling validation module. Illustratively, a jump instruction is inserted into the exception handler dispatcher to redirect flow to an exception handling validation module in accordance with an embodiment of the present invention. Further, in another embodiment, the exception handler dispatcher is hooked by redirecting calls to the exception handler dispatcher, for example, to an exception handling validation module. In one particular embodiment, the exception handler dispatcher is a function called KiUserExceptionDispatcher( ), which is hooked in operation 204. The KiUserExceptionDispatcher( ) is part of the NTDLL.DLL (the native API).

From hook exception handler dispatcher operation 204, flow moves to an invoke exception handler dispatcher operation 206. In invoke exception handler dispatcher operation 206, the exception handler dispatcher is invoked, e.g., an application in which an exception occurs raises an exception thus invoking the exception handler dispatcher. Illustratively, the exception handler dispatcher is invoked by executing the exception handler dispatcher or otherwise by putting into effect or operation the exception handler dispatcher. In another embodiment, the exception handler dispatcher is invoked by making a call to the exception handler dispatcher. In one embodiment, an exception is raised thus invoking the exception handler dispatcher.

More particularly, the exception handler dispatcher that was hooked in hook exception handler dispatcher operation 204 is invoked in invoke exception handler dispatcher operation 206.

From invoke exception handler dispatcher operation 206, flow moves to a stall execution of exception handler dispatcher operation 208. In stall execution of exception handler dispatcher operation 208, execution of the exception handler dispatcher is stalled. More particularly, upon invocation of the exception handler dispatcher in invoke exception handler dispatcher operation 206, execution of the exception handler dispatcher is stalled in stall execution of exception handler dispatcher operation 208. By stalling the execution of the exception handler dispatcher, execution of any exception handlers is stalled.

From stall execution of exception handler dispatcher operation 208, flow moves to an exception handling valid check operation 210. In exception handling valid check operation 210, a determination is made as to whether the exception handling is valid. If a determination is made in exception handling valid check operation 210 that the exception handling is valid, e.g., that the exception handler frames on the stack of the thread in which an exception occurred are not corrupt, flow moves to an allow execution of exception handler dispatcher to proceed operation 212.

In allow execution of exception handler dispatcher to proceed operation 212, execution of the exception handler dispatcher is allowed to proceed. For example, the exception handler dispatcher is executed to handle the exception that invoked the exception handler dispatcher. As discussed above, execution of the exception handler dispatcher was stalled in stall execution of exception handler dispatcher operation 208. From allow execution of exception handler dispatcher to proceed operation 212, flow moves to and exits at an exit operation 214 or waits for the next invocation of the exception handler dispatcher, e.g., for the next exception, and returns to operation 206.

In a typical exception handler buffer overflow attack, such as that discussed by McCorkendale and Szor in the article entitled "Code Red Buffer Overflow", virus bulletin 2001, pages 4-5, herein incorporated by reference in its entirety, the exception handler frames on the stack are exploited using a buffer overflow. More particularly, an exception handler frame is overflowed and via the modified exception handler frame the malicious code of the attack is forced to execute.

Thus, when an exception is raised, e.g., due to the buffer overflow exploit itself, the exception handler dispatcher attempts to locate an exception handler by searching the exception handler frames on the stack of the thread in which an exception occurred. Thus, since a determination is made that the exception handling is valid, e.g., that the exception handler frames on the stack of the thread in which an exception occurred are not corrupt, in exception handling valid check operation 210, the likelihood that malicious code is attempting an attack on host computer system 102 is minimal. In one embodiment, malicious code is defined as any computer program, module, set of modules, or code that enters a computer system without an authorized user's knowledge and/or without an authorized user's consent.

However, if a determination is made in exception handling valid check operation 210 that the exception handling is not valid, e.g., that the exception handler frames on the stack of the thread in which an exception occurred are corrupt, flow moves, optionally, to a known false positive check operation 216 (or directly to a take protective action operation 218 if known false positive check operation 216 is not performed).

In known false positive check operation 216, a determination is made as to whether the invalid exception handling is a known false positive. A known false positive invalid exception handling is an invalid exception handling that is, in fact, safe, i.e., is not associated with malicious code. Illustratively, a user-defined or downloadable exclusion and/or inclusion list is used to determine whether the invalid exception handling is a known false positive.

If a determination is made in known false positive check operation 216 that the invalid exception handling is a known false positive, flow moves to allow execution of exception handler dispatcher to proceed operation 212, which is performed as discussed above. Conversely, if a determination is made in known false positive check operation 216 that the invalid exception handling is not a known false positive, flow moves to take protective action operation 218.

In take protective action operation 218, protective action is taken to prevent the malicious code on host computer system 102 from causing damage to or exploiting host computer system 102. For example, execution of the exception handler dispatcher is terminated. As discussed above, execution of the exception handler dispatcher was stalled in stall call operation 208.

By terminating execution of the exception handler dispatcher, the malicious code, e.g., the CodeRed or Welchia worms that use exception handling hijacking, on host computer system 102 is prevented from exploiting and/or damaging host computer system 102. In one embodiment, by preventing execution of the exception handler dispatcher, remote access is denied thus preventing unauthorized access by malicious hackers as well as by replicating malware, e.g., worms.

As another example of protective action, the application or thread that raised the exception is terminated. Termination of applications is well known to those of skill in the art and so is not discussed further for clarity of discussion.

Flow moves from take protective action operation 218, optionally, to a notify host computer system user/administrator operation 220 (or directly to exit operation 214 if operation 220 is not performed). In notify host computer system user/administrator operation 220, the user of host computer system 102 and/or the administrator are notified that protective action has been taken on host computer system 102, e.g., that execution of the exception handler dispatcher, an application and/or a thread have been terminated. The user and/or administrator can be notified using any one of a number of techniques, e.g., by using a pop up window, by writing to a file and/or otherwise by logging the event. Further, a notification can be provided to a security center.

From notify host computer system user/administrator operation 220, flow moves to and exits at exit operation 214 or waits for the next invocation of the exception handler dispatcher, e.g., for the next exception, and returns to operation 206.

Figure 3:
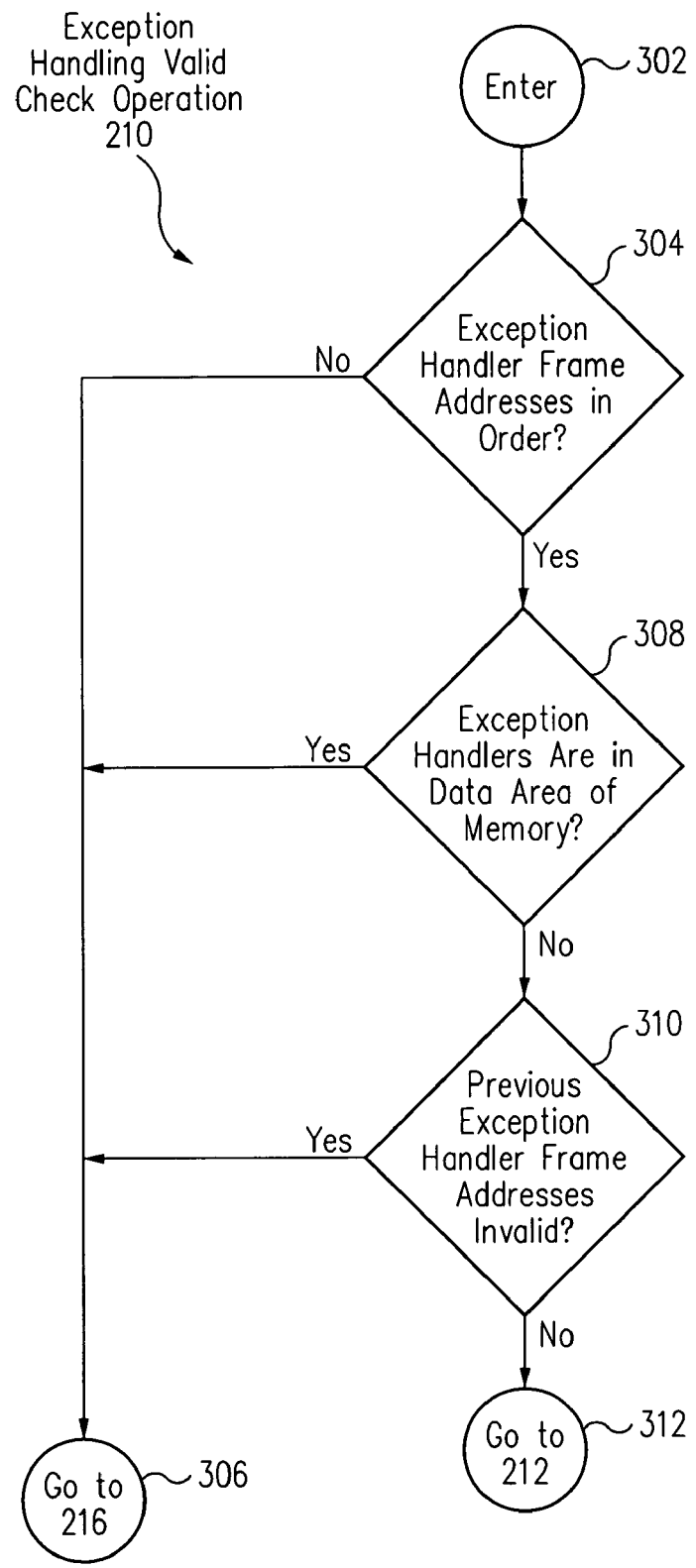
FIG. 3 is a flow diagram of an exception handling valid check operation of the host computer process of FIG. 2 in accordance with one embodiment of the present invention.
Figure 4:
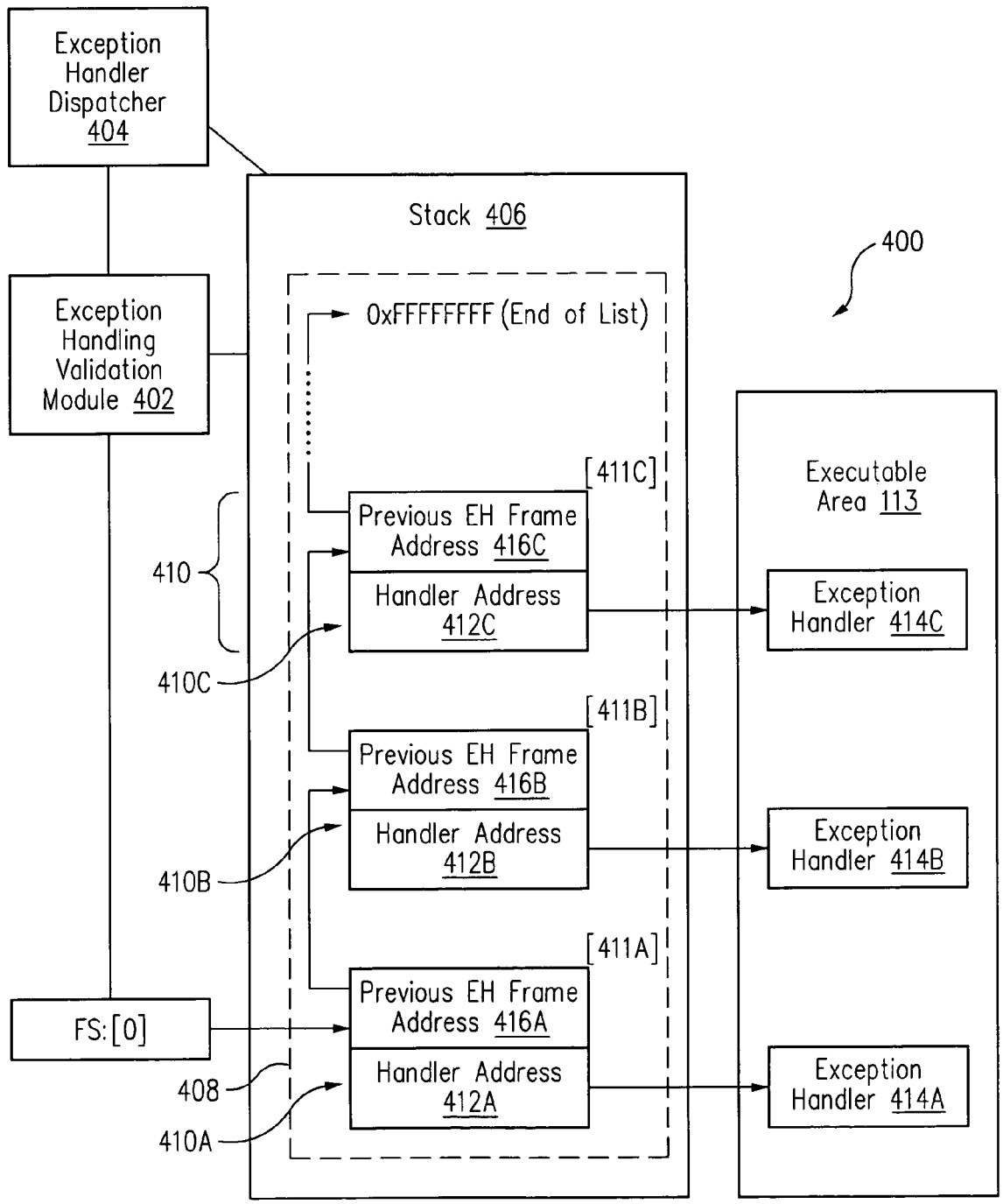
FIGS. 4, 5, and 6 are exception handler frame stack layouts in accordance with various embodiments of the present invention.

FIG. 3 is a flow diagram of exception handling valid check operation 210 of host computer process 200 of FIG. 2 in accordance with one embodiment of the present invention. FIG. 4 is an exception handler frame stack layout 400 in accordance with one embodiment of the present invention.

Referring now to FIGS. 2, 3 and 4 together, an exception handling validation module 402 (FIG. 4) is used to hook an exception handler dispatcher 404 in hook exception handler dispatcher operation 204 as discussed above.

In invoke exception handler dispatcher operation 206, exception handler dispatcher 404 is invoked, e.g., by raising an exception. Since exception handler dispatcher 404 is hooked, control transfers to exception handling validation module 402 in stall execution of exception handler dispatcher operation 208. In one embodiment, exception handling validation application 106 includes exception handling validation module 402.

Paying particular attention to FIG. 3, from an enter operation 302 (and from stall execution of exception handler dispatcher operation 208 of FIG. 2), flow moves to an exception handler frame addresses in order check operation 304. In exception handler frame addresses in order check operation 304, a determination is made as to whether the exception handler frame addresses are in order.

If the exception handler frame addresses are not in order, flow moves to known false positive check operation 216 through an operation 306. Alternatively, if the exception handler frame addresses are in order, flow moves to an exception handlers are in data area of memory check operation 308.

As is well known to those of skill in the art, exception handler frames form a linked list, with the head of the linked list pointed to by a pointer stored at address FS[0], sometimes called the thread information block (TIB). As each new exception handler is set up, a new exception handler frame is created on the stack, the new exception handler frame including a pointer, sometimes called a previous exception handler frame address, to the previous exception handler frame. Each successive exception handler frame should be higher on the stack (have a lower address).

An exception handler frame is a structure that includes a handler address of the associated exception handler and a previous exception handler frame address of the previous exception handler frame. An exception handler frame typically includes other data well known to those of skill in the art so is not discussed further to avoid detracting from the principles of the invention.

An exception handler is an executable application. When an exception occurs, the exception handler dispatcher starts at the head of the linked list with the exception handler frame having the lowest address (highest on the stack), and invokes the associated exception handler. More particularly, during operation, the exception handler dispatcher reads the handler address from the highest exception handler frame and calls the exception handler at the handler address thus resulting in execution of the exception handler.

If the execution handler declines to handle the exception, the exception handler dispatcher moves down the linked list, i.e., moves to exception handler frames of increasing addresses, invoking the associated exception handlers until the exception is handled or the end of the linked list is reached.

Thus, returning to exception handler frame addresses in order check operation 304, a determination is made as to whether the exception handler frame addresses are successively increasing from the first exception handler frame, i.e., whether each successive exception handler frame was placed higher up on the stack.

To illustrate, referring to FIG. 4, a stack 406 includes a linked list 408 of exception handler frames 410, including first, second, and third exception handler frames 410A, 410B, 410C located at exception handler frame addresses 411A, 411B, 411C, respectively. Stack 406 is part of memory 114 (FIG. 1) in one embodiment.

Exception handler frames 410A, 410B, 410C include handler addresses 412A, 412B, 412C, which are the addresses of exception handlers 414A, 414B, 414C, respectively. Exception handler frames 410A, 410B, and 410C further include previous exception handler frame addresses 416A, 416B, and 416C, respectively.

Accordingly, exception handling validation module 402 reads the pointer stored at address FS[0] and moves to exception handler frame 410A. More particularly, the pointer stored at address FS[0] is exception handler frame address 411A of exception handler frame 410A. Exception handling validation module 402 further reads previous exception handler frame address 416A in exception handler frame 410A.

Exception handling validation module 402 verifies that previous exception handler frame address 416A in exception handler frame 410A is lower on stack 406, i.e., has a higher address on stack 406, than address 411A of exception handler frame 410A. This process is repeated for each exception handler frame until the end of linked list 408 is reached.

To illustrate, previous exception handler frame address 416A in exception handler frame 410A is address 411B of exception handler frame 410B. Accordingly, exception handling validation module 402 moves to exception handler frame 410B. Exception handling validation module 402 further reads previous exception handler frame address 416B in exception handler frame 410B.

Exception handling validation module 402 verifies that previous exception handler frame address 416B in exception handler frame 410B is lower on stack 406, i.e., has a higher address on stack 406, than address 411B of exception handler frame 410B. This process is repeated for each exception handler frame until the end of linked list 408 is reached. Although a stack 406 having three exception handler frames 410A, 410B, and 410C is set forth, in light of this disclosure, those of skill in the art will understand that a stack can have more or less than three exception handler frames.

In accordance with this embodiment, exception handler frames 410A, 410B and 410C have successively higher addresses, i.e., are successively lower on stack 406. More particularly, exception handler frame 410A is highest on stack 406 and has the lowest address, followed by exception handler frame 410B and then exception handler frame 410C. Accordingly, a determination is made that the exception handler frame addresses are in order in exception handler frame addresses in order check operation 304 and flow moves to exception handlers are in data area of memory check operation 308.

In exception handlers are in data area of memory check operation 308, a determination is made as to whether any of the exception handlers are in the stack or heap and, more generally, are in a data area of memory. If any of the exception handlers are in the stack or heap and, more generally, are in a data area of memory, flow moves from check operation 308 to known false positive check operation 216 through operation 306. Alternatively, if all of the exception handlers are not in the stack or heap and, more generally, are in an executable area of memory, flow moves from check operation 308 to a previous exception handler frame addresses invalid check operation 310.

More particularly, in exception handlers are in data area of memory check operation 308, a determination is made as to whether any of the exception handlers associated with the exception handler frames are located in a data area of memory. Generally, exception handlers are executable and should be in an executable area of memory, i.e., in a page marked as executable or marked as executable and writable.

In one embodiment, the page in which the exception handler is located has a SEC_IMAGE attribute meaning that the exception handler is mapped from a file, and thus the exception handler is in an executable area of memory. Conversely, the page in which the exception handler is located does not have an SEC_IMAGE attribute meaning that the exception handler is unmapped code, and thus the exception handler is in a data area of memory.

In another embodiment, the properties of the page in which the exception handler is located indicate that the page is executable and thus the exception handler is in an executable area of memory. Conversely, the properties of the page in which the exception handler is located indicate that the page is non-executable and thus the exception handler is in a data area of memory.

To illustrate, referring again to FIG. 4, exception handler frames 410A, 410B, 410C include handler addresses 412A, 412B, 412C, which are the addresses of exception handlers 414A, 414B, 414C, respectively. Exception handlers 414A, 414B, and 414C are in executable area 113 of memory.

In exception handlers are in data area of memory check operation 308, exception handling validation module 402 reads the pointer stored at address FS[0] and moves to exception handler frame 410A. Exception handling validation module 402 further reads handler address 412A in exception handler frame 410A and determines if handler address 412A is a data area of memory using the SEC_IMAGE attribute or page properties as discussed above. This process is repeated for each exception handler frame and associated handler address, e.g., for exception handler frames 410B, 410C and the associated handler addresses 412B, 412C, until the end of linked list 408 is reached.

In the embodiment illustrated in FIG. 4, handler addresses 412A, 412B and 412C are in (point to) executable areas of memory, i.e., are in (point to) executable area 113, and thus a determination is made in check operation 308 that the exception handlers are not in a data area of memory. Accordingly, flow moves to previous exception handler frame addresses invalid check operation 310.

In previous exception handler frame addresses invalid check operation 310, a determination is made as to whether any of the previous exception handler frame addresses are invalid, e.g., point to an invalid page. In one embodiment, a page is invalid if the properties of the page indicate that the page is invalid.

If any of the previous exception handler frame addresses are invalid, flow moves from check operation 310 to known false positive check operation 216 through operation 306. Alternatively, if all of the previous exception handler frame addresses are valid, flow moves from check operation 310 to allow execution of exception handler dispatcher to proceed operation 212 through operation 312.

More particularly, in previous exception handler frame addresses invalid check operation 310, a determination is made as to whether any of the previous exception handler frame addresses in the exception handler frames are invalid, e.g., point to an invalid page.

To illustrate, referring again to FIG. 4, exception handler frame 410A includes previous exception handler frame address 416A. Previous exception handler frame address 416A points to the page in which exception handler frame 410B is located, i.e., a valid page. This process is repeated for each exception handler frame until the end of linked list 408 is reached. Because each exception handler frame address points to a valid page in this embodiment, a determination is made in previous exception handler frame addresses invalid check operation 310 that all of the previous exception handler frame addresses are valid and flow moves to allow execution of exception handler dispatcher to proceed operation 212 through operation 312.

Figure 5:
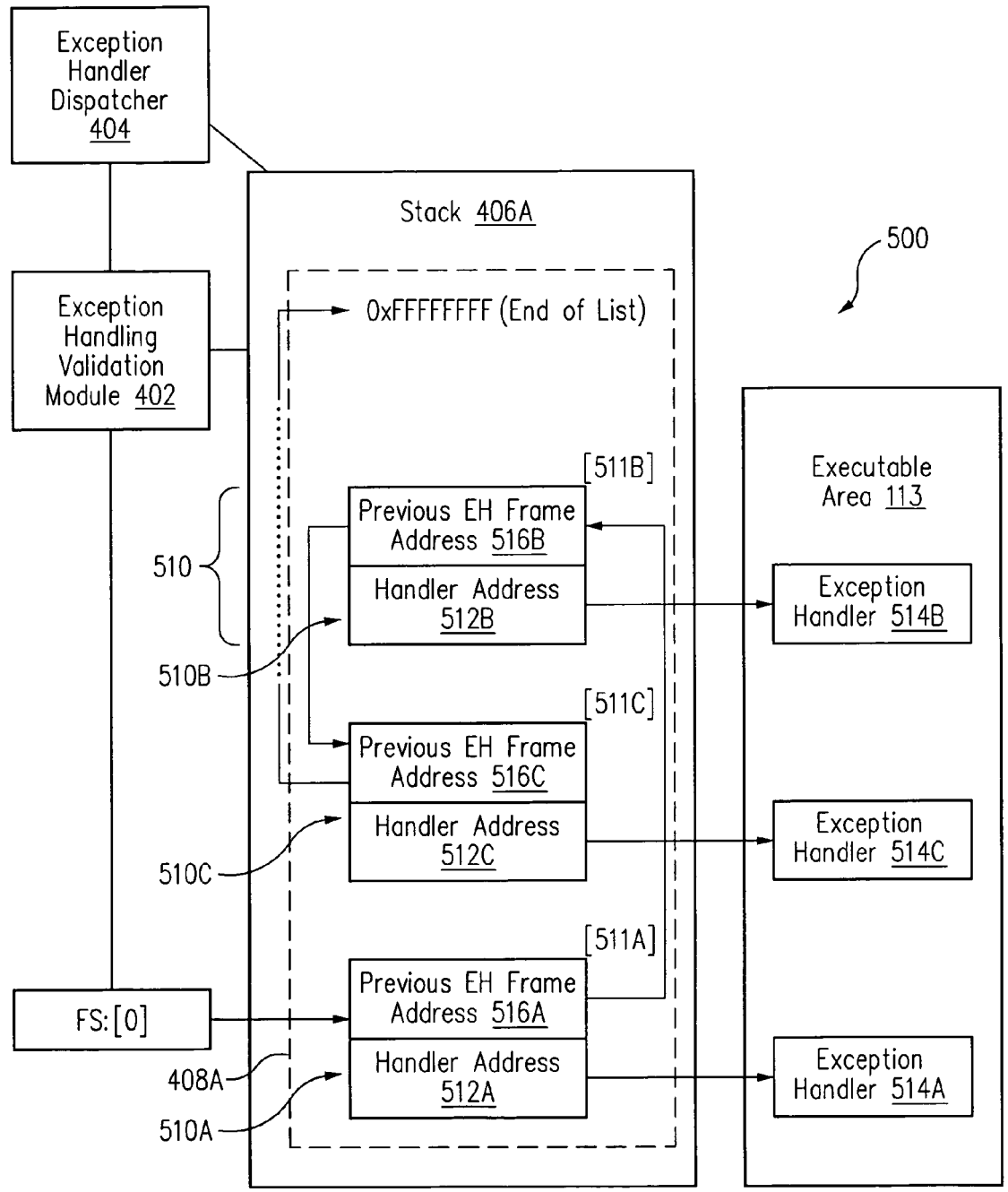

FIG. 5 is an exception handler frame stack layout 500 in accordance with one embodiment of the present invention. Exception handler frame stack layout 500 of FIG. 5 is similar to exception handler frame stack layout 400 of FIG. 4 and only the significant differences are discussed below.

Referring now to FIGS. 2, 3 and 5 together, operations 202, 204, 206 and 208 are performed as discussed above and flow moves to exception handler frame addresses in order check operation 304 (FIG. 3).

In accordance with this embodiment, a stack 406A includes a linked list 408A of exception handler frames 510, including first, second, and third exception handler frames 510A, 510B, 510C located at exception handler frame addresses 511A, 511B, 511C, respectively. Exception handler frames 510A, 510B, 510C include handler addresses 512A, 512B, 512C, which are the addresses of exception handlers 514A, 514B, 514C, respectively. Exception handler frames 510A, 510B and 510C further include previous exception handler frame addresses 516A, 516B, and 516C, respectively.

Accordingly, exception handling validation module 402 reads the pointer stored at address FS[0] and moves to exception handler frame 510A. More particularly, the pointer stored at address FS[0] is exception handler frame address 511A of exception handler frame 510A. Exception handling validation module 402 further reads previous exception handler frame address 516A in exception handler frame 510A.

Exception handling validation module 402 verifies that previous exception handler frame address 516A in exception handler frame 510A is lower on stack 406A, i.e., has a higher address on stack 406A, than address 511A of exception handler frame 510A. In this embodiment, previous exception handler frame address 516A in exception handler frame 510A is address 511B of exception handler frame 510B. Address 511B of exception handler frame 510B is greater than address 511A of exception handler frame 510A. Accordingly, exception handling validation module 402 moves to exception handler frame 510B. Exception handling validation module 402 further reads previous exception handler frame address 516B in exception handler frame 510B.

Exception handling validation module 402 determines that previous exception handler frame address 516B in exception handler frame 510B is higher on stack 406A, i.e., has a lower address on stack 406A, than address 511B of exception handler frame 510B. More particularly, address 511C of exception handler frame 510C is less than address 511B of exception handler frame 510B. Accordingly, a determination is made that the exception handler frame addresses are not in order in exception handler frame addresses in order check operation 304 and flow moves to known false positive check operation 216 through operation 306.

Because exception handler frame 510C is higher on stack 406A than exception handler frame 510B, the exception handler frames on stack 406A are corrupt, e.g., a previous exception handler frame address had been maliciously replaced, indicating an exception handler buffer overflow attack has occurred. Accordingly, after a negative determination in known false positive check operation 216, protective action is taken in take protective action operation 218.

Figure 6:
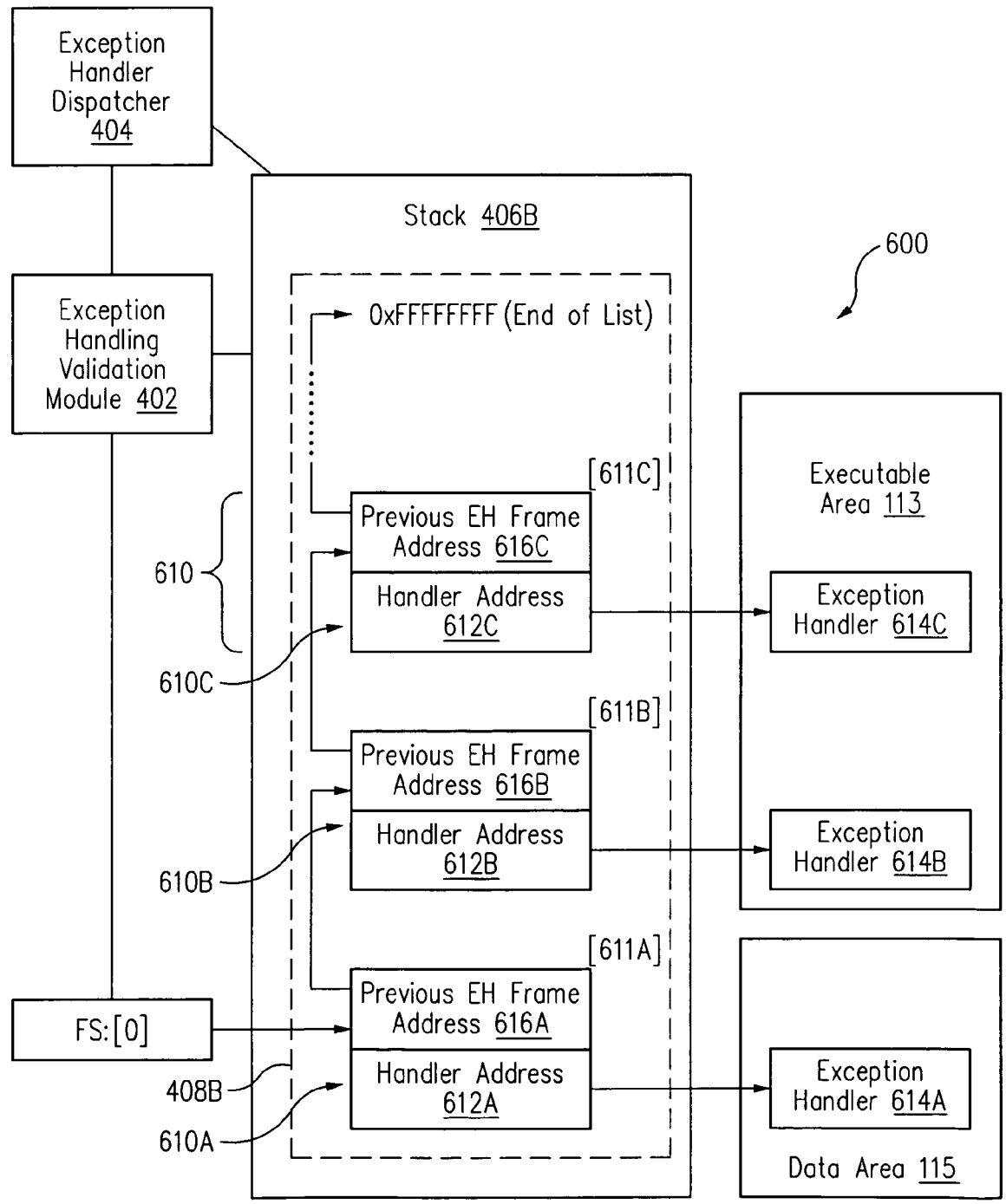

FIG. 6 is an exception handler frame stack layout 600 in accordance with one embodiment of the present invention. Exception handler frame stack layout 600 of FIG. 6 is similar to exception handler frame stack layout 400 of FIG. 4 and only the significant differences are discussed below.

Referring now to FIGS. 2, 3 and 6 together, operations 202, 204, 206 and 208 are performed as discussed above and flow moves to exception handler frame addresses in order check operation 304 (FIG. 3).

In accordance with this embodiment, a stack 406B includes a linked list 408B of exception handler frames 610, including first, second, and third exception handler frames 610A, 610B, 610C located at exception handler frame addresses 611A, 611B, 611C, respectively. Exception handler frames 610A, 610B, 610C include handler addresses 612A, 612B, 612C, which are the addresses of exception handlers 614A, 614B, 614C, respectively. Exception handler frames 610A, 610B and 610C further include previous exception handler frame addresses 616A, 616B and 616C, respectively.

Accordingly, exception handling validation module 402 reads the pointer stored at address FS[0] and moves to exception handler frame 610A. More particularly, the pointer stored at address FS[0] is exception handler frame address 611A of exception handler frame 610A. Exception handling validation module 402 further reads previous exception handler frame address 616A in exception handler frame 610A. Exception handling validation module 402 verifies that previous exception handler frame address 616A in exception handler frame 610A is lower on stack 406B, i.e., has a higher address on stack 406B, than address 611A of exception handler frame 610A. This process is repeated for each exception handler frame until the end of linked list 408B is reached.

In accordance with this embodiment, exception handler frames 610A, 610B and 610C have successively higher addresses, i.e., are successively lower on stack 406B. Accordingly, a determination is made that the exception handler frame addresses are in order in exception handler frame addresses in order check operation 304 and flow moves to exception handlers are in data area of memory check operation 308.

In exception handlers are in data area of memory check operation 308, a determination is made as to whether any of the exception handlers are in the stack or heap and, more generally, are in a data area of memory. In this embodiment, exception handler frames 610A, 610B, 610C include handler addresses 612A, 612B, 612C, which are the addresses of exception handlers 614A, 614B, 614C, respectively. Exception handler 614A is in data area 115 of memory and exception handlers 614B and 614C are in executable area 113 of memory.

In exception handlers are in data area of memory check operation 308, exception handling validation module 402 reads the pointer stored at address FS[0] and moves to exception handler frame 610A. Exception handling validation module 402 further reads handler address 612A in exception handler frame 610A and determines that handler address 612A is in (points to) data area 115 of memory using the SEC_IMAGE attribute or page properties as discussed above. Accordingly, a determination is made that at least one exception handler is in a data area of memory in exception handlers are in data area of memory check operation 308 and flow moves to known false positive check operation 216 through operation 306.

Because exception handler 614A is in data area 115, the exception handler frames on the stack 406B are corrupt, e.g., a handler address had been maliciously replaced and/or code has been injected into a data area, e.g., the stack or heap, indicating an exception handler buffer overflow attack has occurred. Accordingly, after a negative determination in known false positive check operation 216, protective action is taken in take protective action operation 218.

Referring again to FIG. 3, exception handling valid check operation 210 is set forth as including check operation 304, 308, and 310. However, in another embodiment, exception handling valid check operation 210 includes only a single check operation 304, 308 or 310 or a combination thereof. Further, check operation 304 is set forth as preceding check operation 308, which is set forth as preceding check operation 310. However, check operations 304, 308 and 310 are performed in other orders or simultaneously in other embodiments. Further, as discussed further below in reference to FIG. 7, check operations similar to check operations 304, 308 and 310 are performed on each exception handling frame before moving to the next exception handling frame in another embodiment.

Figure 7:
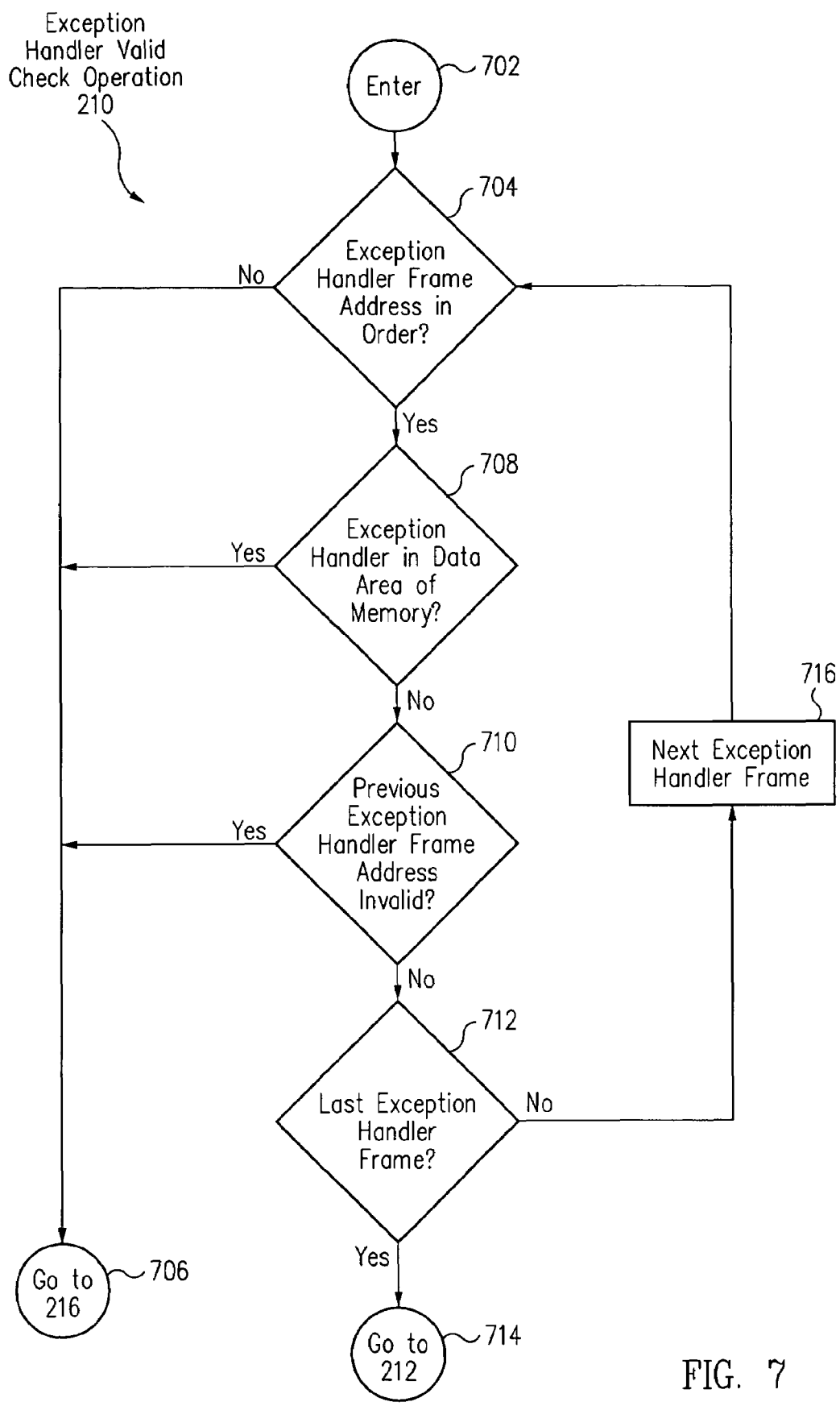
FIG. 7 is a flow diagram of an exception handling valid check operation of the host computer process of FIG. 2 in accordance with another embodiment of the present invention.

FIG. 7 is a flow diagram of exception handling valid check operation 210 of host computer process 200 of FIG. 2 in accordance with another embodiment of the present invention.

Referring now to FIG. 7, from an enter operation 702 (and from stall execution of exception handler dispatcher operation 208 of FIG. 2), flow moves to an exception handler frame address in order check operation 704. In exception handler frame address in order check operation 704, a determination is made as to whether the exception handler frame address of the current exception handler frame is in order. Initially, the first exception handler frame pointed at by the pointer located at FS[0], i.e., the exception handling frame highest in the stack, is the current exception handler frame.

If the exception handler frame address is not in order, i.e., the exception handler frame address is out of sequence as discuss above in reference to check operation 304 of FIG. 3, flow moves to known false positive check operation 216 through operation 706. Alternatively, if the exception handler frame address is in order, flow moves to an exception handler in data area of memory check operation 708.

In exception handler in data area of memory check operation 708, a determination is made as to whether the exception handler associated with the current exception handler frame is in the stack or heap and, more generally, is in a data area of memory. If the exception handler is in the stack or heap and, more generally, is in a data area of memory, flow moves from check operation 708 to known false positive check operation 216 through operation 706. More particularly, if the handler address of the current exception handler frame points to the stack or heap and, more generally, points to a data area of memory, flow moves from check operation 708 to known false positive check operation 216 through operation 706.

Alternatively, if the exception handler is not in the stack or heap and, more generally, is in an executable area of memory, flow moves from check operation 708 to a previous exception handler frame address invalid check operation 710. More particularly, if the handler address of the current exception handler frame does not point to the stack or heap and, more generally, points to an executable area of memory, flow moves from check operation 708 to previous exception handler frame address invalid check operation 710.

In previous exception handler frame address invalid check operation 710, a determination is made as to whether the previous exception handler frame address in the current exception handler frame is invalid, e.g., points to an invalid page. If the previous exception handler frame address is invalid, flow moves from check operation 710 to known false positive check operation 216 through operation 706. Alternatively, if the previous exception handler frame address is valid, flow moves from check operation 710 to last exception handler frame check operation 712.

In last exception handler frame check operation 712, a determination is made as to whether the current exception handler frame is the last of the linked list of exception handler frames. If the current exception handler frame is the last of the linked list of exception handler frames, flow moves from check operation 712 to allow execution of exception handler dispatcher to proceed operation 212 through operation 714. Alternatively, if the current exception handler frame is not the last of the linked list of exception handler frames, flow moves from check operation 712 to a next exception handler frame operation 716.

In next exception handler frame operation 716, the next exception handler frame in the linked list of exception handler frames is selected as the current exception handler frame to be operated upon. Check operation 704, 708, and 710 are repeated on this newly selected current exception handler frame. Operations 716, 704, 708, 710 and 712 are repeated until flow exits at operation 706 (in the case of a corrupted exception handler frame) or a determination is made in last exception handler frame check operation 712 that the current exception handler frame is the last in the linked list of exception handler frames and flow exits at operation 714 (in the case of valid exception handling).

Figure 8:
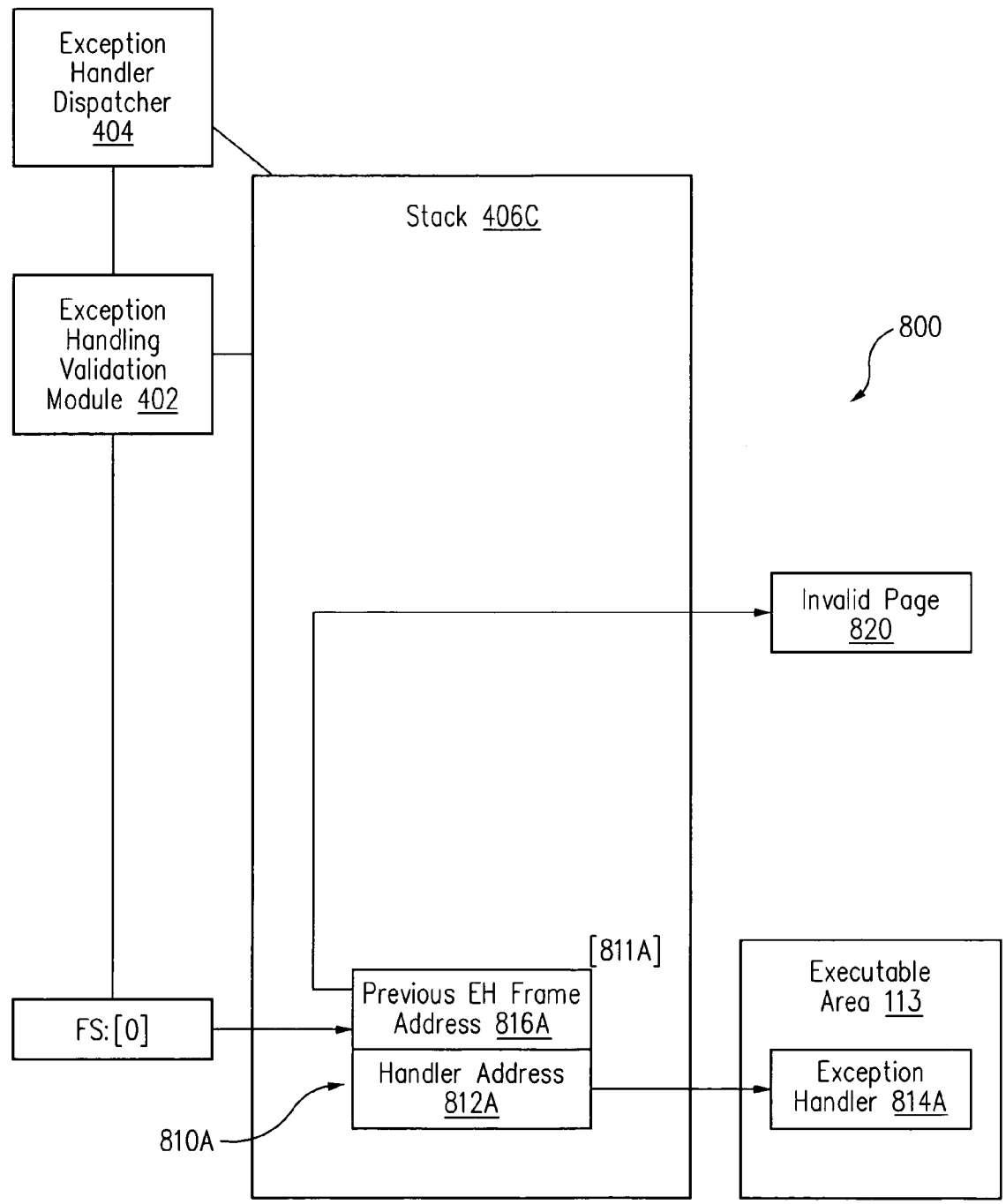
FIG. 8 is an exception handler frame stack layout in accordance with another embodiment of the present invention.

FIG. 8 is an exception handler frame stack layout 800 in accordance with another embodiment of the present invention. Exception handler frame stack layout 800 of FIG. 8 is similar to exception handler frame stack layout 400 of FIG. 4 and only the significant differences are discussed below.

Referring now to FIGS. 2, 7 and 8 together, operations 202, 204, 206 and 208 are performed as discussed above and flow moves to exception handler frame address in order check operation 704.

In accordance with this embodiment, a stack 406C includes an exception handler frame 810A located at exception handler frame address 811A. Exception handler frame 810A include handler address 812A, which is the address of an exception handler 814A. Exception handler frame 810A further includes a previous exception handler frame address 816A.

Accordingly, exception handling validation module 402 reads the pointer stored at address FS[0] and moves to exception handler frame 810A. More particularly, the pointer stored at address FS[0] is exception handler frame address 811A of exception handler frame 810A and is thus in order.

Accordingly, a determination is made that the exception handler frame address is in order in exception handler frame address in order check operation 704 and flow moves to exception handler in data area of memory check operation 708.

In this embodiment, exception handler frame 810A includes handler address 812A, which is the address of exception handler 814A. Exception handler 814A is in executable area 113 of memory.

Exception handling validation module 402 reads handler address 812A in exception handler frame 810A and determines that handler address 812A is in (points to) executable area 113 of memory using the SEC_IMAGE attribute or page properties as discussed above. Thus, a determination is made in check operation 708 that the exception handler is not in a data area of memory. Accordingly, flow moves to previous exception handler frame address invalid check operation 710.

In accordance with this embodiment, exception handler frame 810A includes previous exception handler frame address 816A. Previous exception handler frame address 816A points to an invalid page 820. Thus, a determination is made in previous exception handler frame address invalid check operation 710 that the previous exception handler frame address is invalid and flow moves to known false positive check operation 216 through operation 706.

Because previous exception handler frame address 816A points to invalid page 820, the exception handler frames on stack 406C are corrupt, e.g., a previous exception handler frame address had been maliciously replaced, indicating an exception handler buffer overflow attack has occurred. Accordingly, after a negative determination in known false positive check operation 216, protective action is taken in take protective action operation 218.

Referring again to FIG. 1, exception handling validation application 106 is in computer memory 114. As used herein, a computer memory refers to a volatile memory, a non-volatile memory, or a combination of the two.

Although exception handling validation application 106 is referred to as an application, this is illustrative only. Exception handling validation application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor. In one embodiment, exception handling validation application 106 is implemented as a system level, e.g., kernel mode driver.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, exception handling validation application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102 and/or server system 130 is a portable computer, a workstation, a two-way pager, a cellular telephone, a digital wireless telephone, a personal digital assistant, a server computer, an Internet appliance, or any other device that includes components that can execute the exception handling validation functionality in accordance with at least one of the embodiments as described herein. Similarly, in another embodiment, host computer system 102 and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the exception handling validation functionality in accordance with one embodiment of present invention can be implemented in a wide variety of computer system configurations. In addition, the exception handling validation functionality could be stored as different modules in memories of different devices. For example, exception handling validation application 106 could initially be stored in server system 130, and then as necessary, a portion of exception handling validation application 106 could be transferred to host computer system 102 and executed on host computer system 102. Consequently, part of the exception handling validation functionality would be executed on processor 134 of server system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, exception handling validation application 106 is stored in memory 136 of server system 130. Exception handling validation application 106 is transferred over network 124 to memory 114 in host computer system 102. In this embodiment, network interface 138 and I/O interface 110 would include analog modems, digital modems, or a network interface card. If modems are used, network 124 includes a communications network, and exception handling validation application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   hooking an exception handler dispatcher;
   stalling execution of said exception handler dispatcher upon invocation of said exception handler dispatcher; and
   determining whether an exception handling is valid, wherein upon a determination that said exception handling is valid, said method further comprising allowing said execution of said exception handler dispatcher to proceed.

2. The method of claim 1 wherein said determining whether an exception handling is valid comprises:
   determining whether exception handler frame addresses are in order.

3. The method of claim 2 wherein said determining whether exception handler frame addresses are in order comprises determining whether said exception handler frame addresses are successively increasing from a first exception handler frame located highest on a stack.

4. The method of claim 1 wherein said determining whether an exception handling is valid comprises:
   determining whether an exception handler is in a data area of memory.

5. The method of claim 4 wherein said determining whether an exception handler is in a data area of memory comprises determining whether a handler address in an exception handler frame points to a page in said data area.

6. The method of claim 1 wherein said determining whether an exception handling is valid comprises:
   determining whether a previous exception handler frame address is invalid.

7. The method of claim 6 wherein said determining whether a previous exception handler frame address is invalid comprises determining whether said previous exception handler frame address in an exception handler frame points to a page that is invalid.

8. The method of claim 1 wherein exception handler frames form a linked list, said determining whether an exception handling is valid comprises:
   determining whether exception handler frame addresses of said exception handler frames are in order.

9. The method of claim 8 wherein said determining whether exception handler frame addresses of said exception handler frames are in order comprises determining whether said exception handler frame addresses are successively increasing from a first exception handler frame located highest on a stack, said linked list comprising said first exception handler frame.

10. The method of claim 1 wherein exception handler frames form a linked list, said determining whether an exception handling is valid comprises:
    determining whether any exception handlers associated with said exception handler frames are in a data area of memory.

11. The method of claim 10 wherein said determining whether any exception handlers associated with said exception handler frames are in a data area of memory comprises determining whether any handler addresses in said exception handler frames point to a page in said data area.

12. The method of claim 1 wherein exception handler frames form a linked list, said determining whether an exception handling is valid comprises:
    determining whether any previous exception handler frame addresses in said exception handler frames are invalid.

13. The method of claim 12 wherein said determining whether any previous exception handler frame addresses in said exception handler frames are invalid comprises determining whether said any previous exception handler frame addresses in said exception handler frames point to a page that is invalid.

14. The method of claim 1 wherein upon a determination that said exception handling is not valid during said determining, said method further comprising taking protective action.

15. The method of claim 14 wherein prior to said taking protective action, said method further comprising determining that said exception handling is not a known false positive exception handling.

16. The method of claim 14 further comprising providing a notification that said protective action has been taken.

17. The method of claim 1 wherein said hooking comprises hooking a function called KiUserExceptionDispatcher( ).

18. The method of claim 1 wherein said hooking comprises modifying said exception handler dispatcher to redirect flow to an exception handling validation module.

19. The method of claim 18 wherein said modifying comprises inserting a jump instruction into said exception handler dispatcher.

20. The method of claim 1 further comprising invoking said exception handler dispatcher, said invoking comprising raising an exception.

21. A method comprising:
    determining that exception handling is valid prior to allowing execution of an exception handler dispatcher, wherein said determining that exception handling is valid is selected from the group of operations consisting of:
    determining whether exception handler frame addresses are in order;
    determining whether an exception handler is in a data area of memory; and
    determining whether a previous exception handler frame address is invalid.

22. A computer program product comprising a tangible computer readable medium containing computer program code comprising:

an exception handling validation application for hooking an exception handler dispatcher;

said exception handling validation application further for stalling execution of said exception handler dispatcher upon invocation of said exception handler dispatcher; and said exception handling validation application further for determining whether an exception handling is valid, wherein upon a determination that said exception handling is valid, said exception handling validation application further for allowing said execution of said exception handler dispatcher to proceed.

23. The computer program product of claim 22 wherein said determining whether an exception handling is valid comprises:

determining whether exception handler frame addresses are in order.

24. The computer program product of claim 22 wherein said determining whether an exception handling is valid comprises:

determining whether an exception handler is in a data area of memory.

25. The computer program product of claim 22 wherein said determining whether an exception handling is valid comprises:

determining whether a previous exception handler frame address is invalid.

\* \* \* \* \*